US012775240B2

(12) United States Patent
Fuji et al.

(10) Patent No.: US 12,775,240 B2
(45) Date of Patent: Oct. 27, 2026

(54) WATCH PART, WATCH, AND METHOD FOR MANUFACTURING WATCH PART

(71) Applicant: SEIKO EPSON CORPORATION, Tokyo (JP)

(72) Inventors: Tsubasa Fuji, Shiojiri (JP); Hikonosuke Uwai, Azumino (JP); Ami Kugimoto, Shiojiri (JP); Ai Yoshinaga, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 323 days.

(21) Appl. No.: 18/191,111

(22) Filed: Mar. 28, 2023

(65) Prior Publication Data

US 2023/0315018 A1 Oct. 5, 2023

(30) Foreign Application Priority Data

Mar. 29, 2022 (JP) ................................ 2022-053343

(51) Int. Cl.
*G04B 19/12* (2006.01)
*G04D 3/00* (2006.01)

(52) U.S. Cl.
CPC .......... *G04B 19/12* (2013.01); *G04D 3/0048* (2013.01); *G04D 3/0069* (2013.01)

(58) Field of Classification Search
CPC ..... G04B 19/12; G04D 3/0048; G04D 3/0069
USPC .......................................................... 368/232
See application file for complete search history.

(56) References Cited

U.S. PATENT DOCUMENTS 3,910,033 A 10/1975 Saito
5,750,241 A 5/1998 Kobayashi et al.
8,243,556 B2 * 8/2012 Yamaguchi .......... H10F 77/311 368/232
10,717,357 B2 * 7/2020 Mochizuki ............ B60K 35/00
2002/0068148 A1 * 6/2002 Nakamura .............. C25D 1/10 428/156
2007/0195651 A1 * 8/2007 Kawakami ............. C23C 28/42 368/232
2009/0129210 A1 5/2009 Yamaguchi et al.
2010/0060987 A1 3/2010 Witzman et al.
2017/0060093 A1 3/2017 Awano et al.

(Continued)

FOREIGN PATENT DOCUMENTS

CN 102540853 A * 7/2012 ............ G04B 19/06
CN 108375893 A * 8/2018 .............. A44C 5/00

(Continued)

OTHER PUBLICATIONS

Kawakami et al. (CN 102540853 A) Machine Translation (Year: 2012).*
Furusato (CN 108375893 A) Machine Translation (Year: 2018).*

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

A watch part includes a substrate and a multilayer film covering at least a part of the substrate, wherein a plurality of recesses are formed at a surface of the substrate facing the multilayer film, and in a cross-sectional view of the substrate taken in a thickness direction thereof, each of the plurality of recesses is defined by a first side and a second side that is inclined with respect to the first side and meets the first side.

10 Claims, 14 Drawing Sheets

(56) References Cited

U.S. PATENT DOCUMENTS

| | | | | |
|---|---|---|---|---|
| 2017/0131684 | A1* | 5/2017 | Cusin | B44C 1/227 |
| 2018/0217558 | A1 | 8/2018 | Furusato | |
| 2018/0217559 | A1 | 8/2018 | Furusato | |
| 2018/0217560 | A1 | 8/2018 | Furusato | |
| 2021/0063968 | A1 | 3/2021 | Furusato | |
| 2021/0124099 | A1 | 4/2021 | Kim et al. | |
| 2023/0315018 | A1 | 10/2023 | Fuji et al. | |

FOREIGN PATENT DOCUMENTS

| | | | |
|---|---|---|---|
| CN | 111683562 | A | 9/2020 |
| EP | 3591099 | A1 | 1/2020 |
| EP | 3896191 | a1 | 10/2021 |
| JP | 2003-108047 | A | 4/2003 |
| JP | 2005-227047 | A | 8/2005 |
| JP | 2007-024698 | A | 2/2007 |
| JP | 2010-185722 | A | 8/2010 |
| JP | 2017-044554 | A | 3/2017 |
| JP | 2018-032015 | A | 3/2018 |
| JP | 2018124269 | A | 8/2018 |
| JP | 2021-032803 | A | 3/2021 |
| JP | 2022-008477 | A | 1/2022 |

* cited by examiner

WATCH PART, WATCH, AND METHOD FOR MANUFACTURING WATCH PART

The present application is based on, and claims priority from JP Application Serial Number 2022-053343, filed Mar. 29, 2022, the disclosure of which is hereby incorporated by reference herein in its entirety.

BACKGROUND

1. Technical Field

The present disclosure relates to a watch part, a watch, and a method for manufacturing a watch part.

2. Related Art

JP-A-2018-124269 discloses a watch part in which a tone adjusting film for adjusting color tone is laminated on a substrate which is a metallic luster portion.

The watch part disclosed in JP-A-2018-124269 adjusts the color tone of the appearance using the metallic luster portion and the tone adjusting film, whereby it is possible to improve aesthetics without using a precious metal as a main material.

In JP-A-2018-124269, aesthetics like that of precious metals can be provided, but there is a problem that only a single color decoration can be added and thus the hue cannot be changed.

SUMMARY

A watch part of the present disclosure includes a substrate and a multilayer film covering at least a part of the substrate, wherein a plurality of recesses are formed at a surface of the substrate facing the multilayer film, and in a cross-sectional view of the substrate taken in a thickness direction thereof, each of the plurality of recesses is defined by a first side and a second side that is inclined with respect to the first side and has one end meeting the first side.

A watch of the present disclosure is a watch configured using the watch part, wherein any one of a dial ring, a glass edge, a movement, a dial, a hand, an abbreviation, and an oscillating weight is configured using the watch part.

A method for manufacturing a watch part according to the present disclosure is a method for manufacturing a watch part including a substrate and a multilayer film covering at least a part of the substrate, the method including forming a plurality of recesses at a surface of the substrate and laminating the multilayer film at least a part of the surface of the substrate at which the plurality of recesses are formed, wherein, in a cross-sectional view of the substrate taken in a thickness direction thereof, each of the plurality of recesses is defined by a first side and a second side that is inclined with respect to the first side and has one end meeting the first side.

A watch of the present disclosure is a watch configured using a watch part manufactured by the above method.

DESCRIPTION OF EXEMPLARY EMBODIMENTS

First Embodiment

A watch 1 according to an embodiment of the present disclosure will be described below with reference to the drawings.

Figure 1:
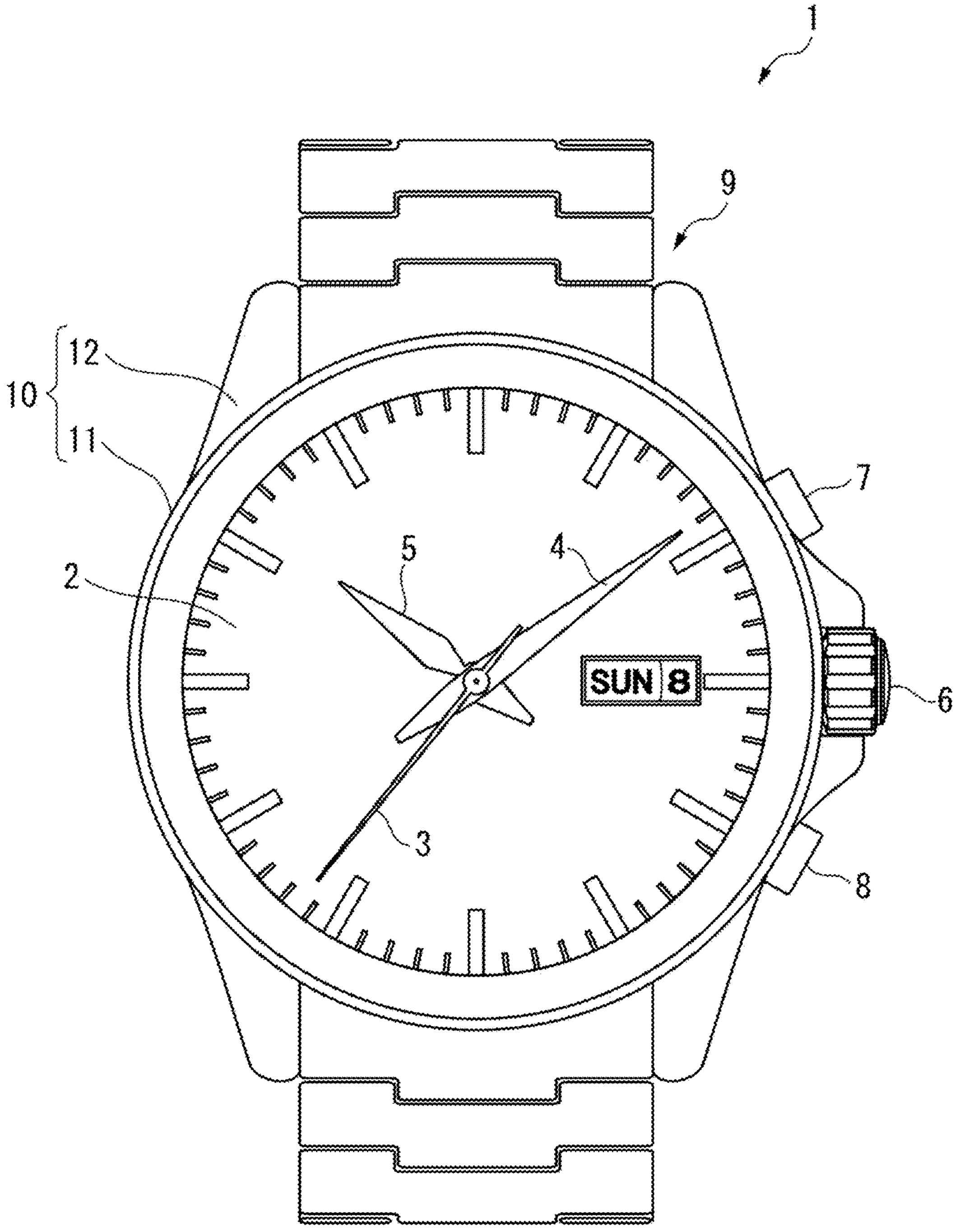
FIG. 1 is a front view showing a watch of a first embodiment.

FIG. 1 is a front view showing a watch 1. In a first embodiment, the watch 1 is configured as a wristwatch worn on a user's wrist.

As shown in FIG. 1, the watch 1 includes a case 10 made of a metal. Inside the case 10, the watch 1 includes a disc-shaped dial 2, a second hand 3, a minute hand 4, an hour hand 5, a crown 6, an A-button 7, and a B-button 8. A band 9 is attached to the case 10.

The case 10 also includes a case body 11 and lugs 12. The case body 11 receives therein the dial 2, the second hand 3, the minute hand 4, the hour hand 5, and the like described above. The lugs 12 are provided at the 6 and 12 o'clock positions of the case body 11. A band 9 is attached to each lug 12 with a spring bar or the like (not shown).

The dial 2 is an example of a watch part of the present disclosure.

Dial 2

Figure 2:
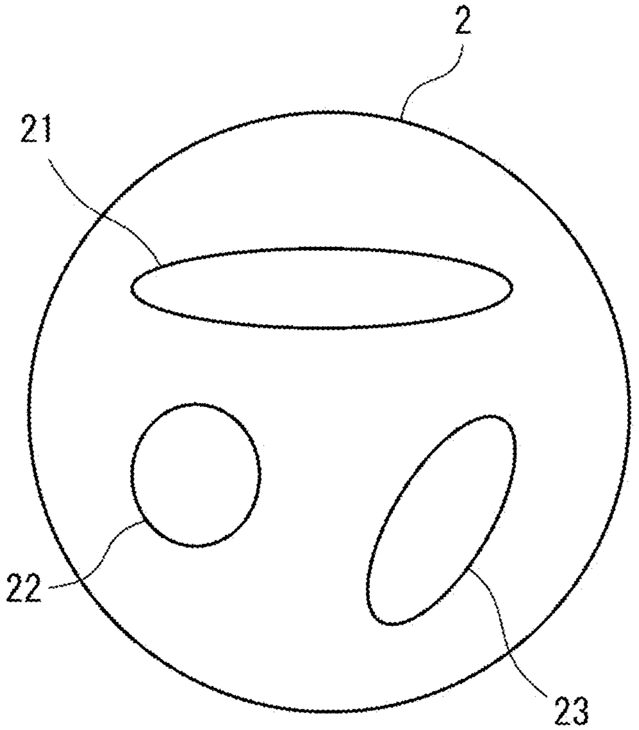
FIG. 2 is a front view showing an outline of a dial of the first embodiment.

FIG. 2 is a front view showing an outline of the dial 2. As shown in FIG. 2, in the first embodiment, the dial 2 has a first region 21, a second region 22, and a third region 23 that are seen in different colors.

First Region

Figure 3:
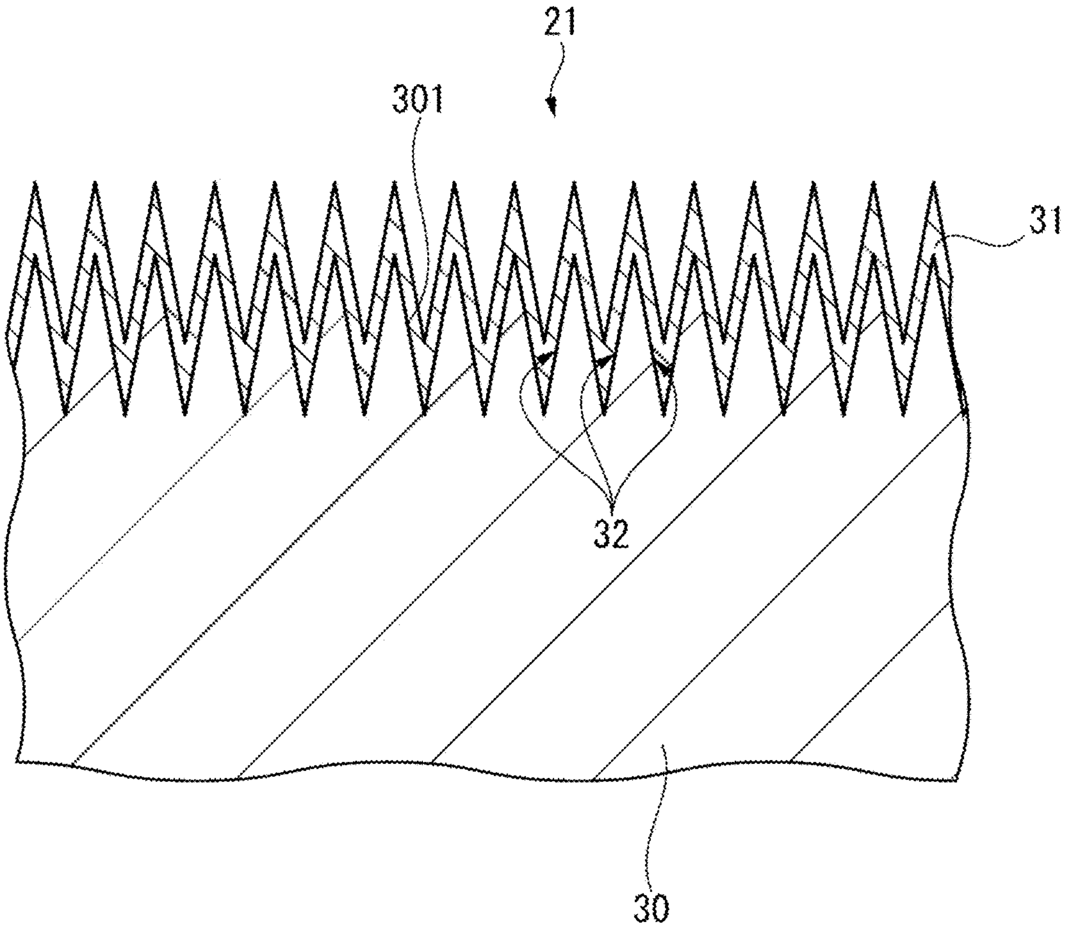
FIG. 3 is a cross-sectional view showing a main part of a first region of the dial of the first embodiment.
Figure 4:
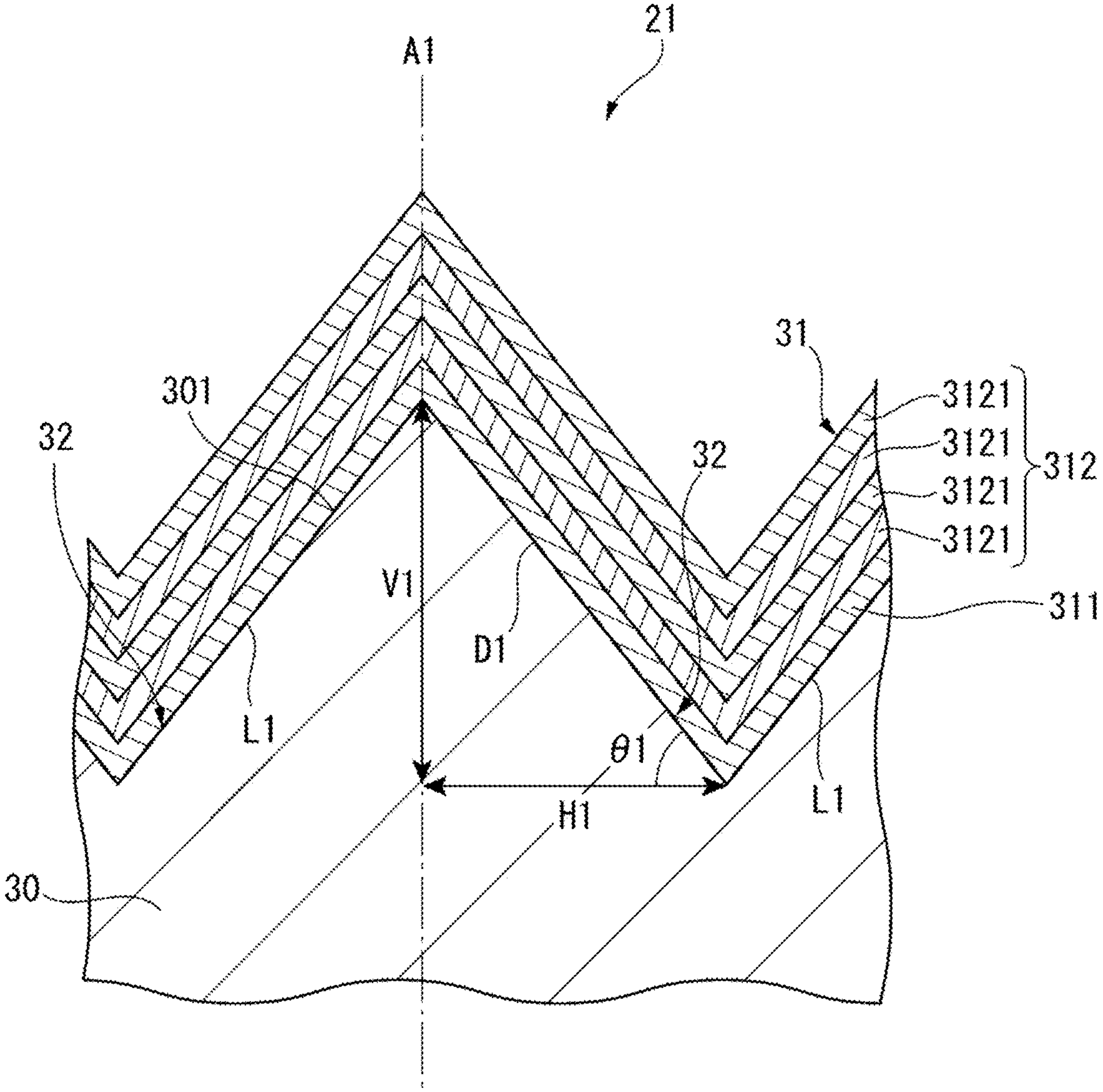
FIG. 4 is an enlarged cross-sectional view showing a main part of the first region of the dial of the first embodiment.
Figure 5:
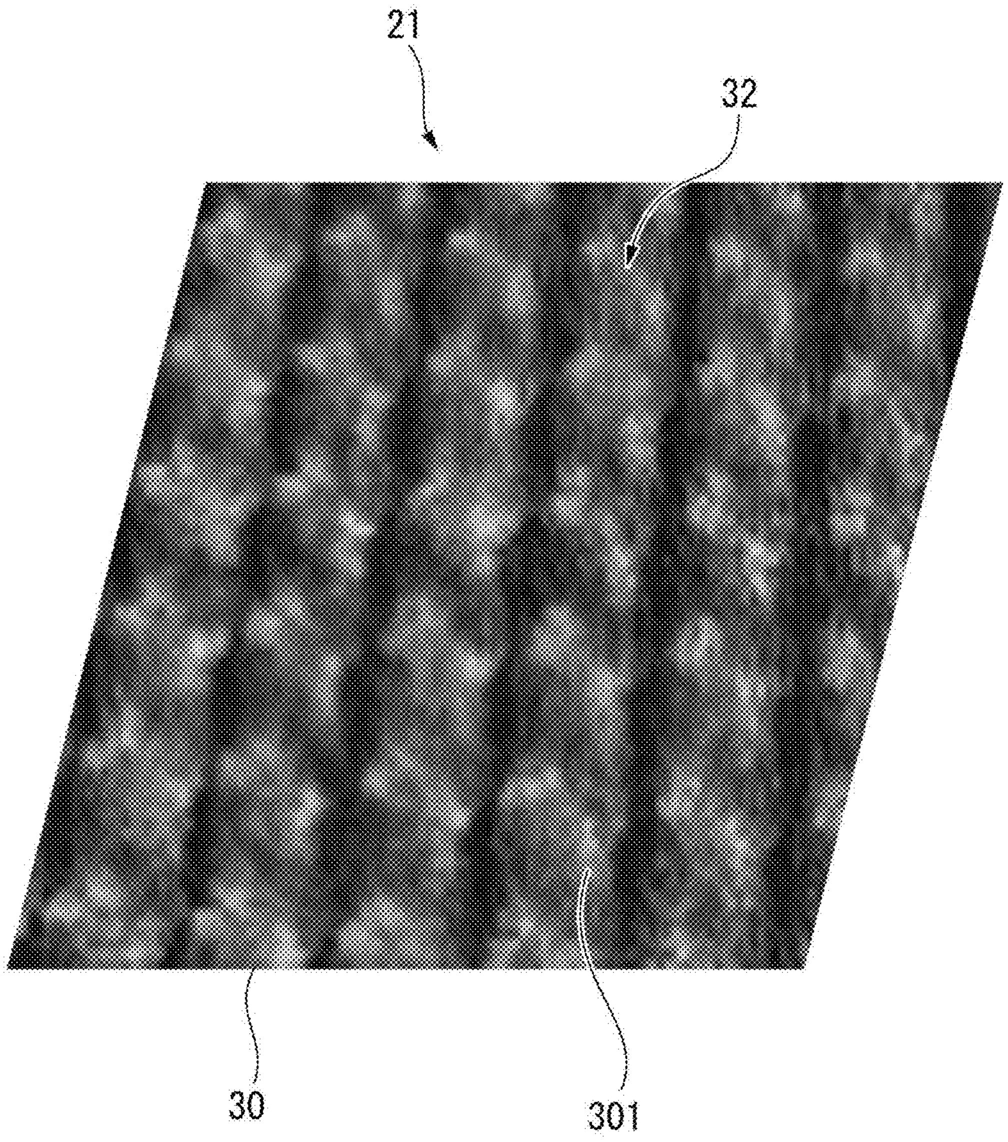
FIG. 5 is a perspective view showing a main part of the first region of the dial of the first embodiment.

FIG. 3 is a cross-sectional view showing a main part of the first region 21, FIG. 4 is an enlarged cross-sectional view showing a main part of the first region 21, and FIG. 5 is an enlarged perspective view showing a main part of the first region 21. FIGS. 3 and 4 are cross-sectional views of a substrate 30 of the dial 2 taken in a thickness direction thereof.

As shown in FIGS. 3 to 5, the first region 21 of the dial 2 includes the substrate 30 and a multilayer film 31. In the first embodiment, the substrate 30 is entirely covered with the multilayer film 31. That is, the multilayer film 31 is laminated to cover the entirety of a surface 301 of the substrate 30. The first region 21 is not limited to that configured as described above, and for example, the multilayer film 31 may be laminated to cover a part of the surface 301 of the substrate 30.

Substrate

The material of the substrate 30 is made of a metal such as iron, brass, or aluminum, resin, glass, or the like. When the substrate 30 is made of resin, it may be a non-translucent resin that does not transmit light or a translucent resin that transmits light. In the first embodiment, a plurality of first recesses 32 are formed on the surface 301 of the substrate 30 in the first region 21.

First Recess

In a cross-sectional view of the substrate 30 taken in the thickness direction, first recesses 32 are each defined by a first straight side L1 and a first oblique side D1 that is inclined with respect to the first straight side L1 and has one end meeting the first straight side L1. The first straight side L1 is inclined such that it is axially symmetrical to the first oblique side D1 with respect to an axis of symmetry A1 extending in the thickness direction of the substrate 30. More specifically, in the first embodiment, the first recesses 32 are formed such that a plurality of conical protrusions are formed on the surface 301 as shown in FIG. 5.

The angle of the first oblique side D1 with respect to a direction orthogonal to the thickness direction of the substrate 30 is defined as θ1.

The first straight side L1 is an example of a first side in the present disclosure and the first oblique side D1 is an example of a second side in the present disclosure.

In the first embodiment, each first recess 32 is formed such that the ratio of a length V1 of the first oblique side D1 in the thickness direction of the substrate 30 to a length H1 of the first oblique side D1 in the direction orthogonal to the thickness direction of the substrate 30 is greater than 1:6. That is, each first recess 32 is formed such that the ratio of V1 to H1 is greater than 1/6.

In other words, each first recess 32 is formed such that the length H1 of the first oblique side D1 in the direction orthogonal to the thickness direction of the substrate 30 is less than 6 when the length V1 of the first oblique side D1 in the thickness direction of the substrate 30 is 1, that is, such that H1 is less than six times V1.

Multilayer Film

The multilayer film 31 includes a color absorbing film 311 and a color adjusting film 312 and is laminated on the substrate 30 on the surface 301 side thereof.

The color absorbing film 311 is laminated on the substrate 30 on the surface 301 side thereof and is formed using a metal. Ag, Pt, Au, Cu, Al, Cr, Sn, Fe, Ti or the like, an alloy thereof, or the like is preferable as the metal forming the color absorbing film 311.

In the first embodiment, the color absorbing film 311 is made of a thin film having a thickness that allows incident light to pass therethrough. Accordingly, it is possible to obtain a luxurious appearance with the dial 2.

A method for forming the color absorbing film 311 is not particularly limited and examples thereof include ion-assisted vapor deposition, ion plating vapor deposition, vacuum vapor deposition, or sputtering.

The color adjusting film 312 is laminated on the substrate 30 on the surface 301 side thereof. In the first embodiment, the color absorbing film 311 and the color adjusting film 312 are laminated on the surface 301 of the substrate 30 in that order. That is, the color absorbing film 311 is arranged between the surface 301 of the substrate 30 and the color adjusting film 312. The color adjusting film 312 adjusts color tone by optical interference.

In the first embodiment, the color adjusting film 312 is made of a multilayer film including inorganic films. That is, the color adjusting film 312 is configured as a laminate including a plurality of inorganic layers 3121.

The inorganic layers 3121 are each preferably made of an inorganic oxide or fluoride or preferably made of a material including at least one selected from the group consisting of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$. The plurality of inorganic layers 3121 are more preferably configured as layers made of different materials selected from the group. This can extend the range of color tones that can be expressed by the dial 2. This can also improve the appearance stability and durability of the dial 2 because such inorganic substances have high chemical stability.

The multilayer film 31 is not limited to that configured as described above and a color adjusting film 312 may be laminated on the substrate 30 on the surface 301 side thereof and a color absorbing film 311 may be laminated on the color adjusting film 312. The order of the color absorbing film 311 and the color adjusting film 312 can be set arbitrarily. The color adjusting film 312 may also be configured to have a metal thin film.

A method for forming each inorganic layer 3121 is not particularly limited and examples thereof include ion-assisted vapor deposition, ion plating vapor deposition, vacuum vapor deposition, or sputtering.

The inorganic layers 3121 are preferably two or more layers, more preferably three or more layers.

Second Region 22

Figure 6:
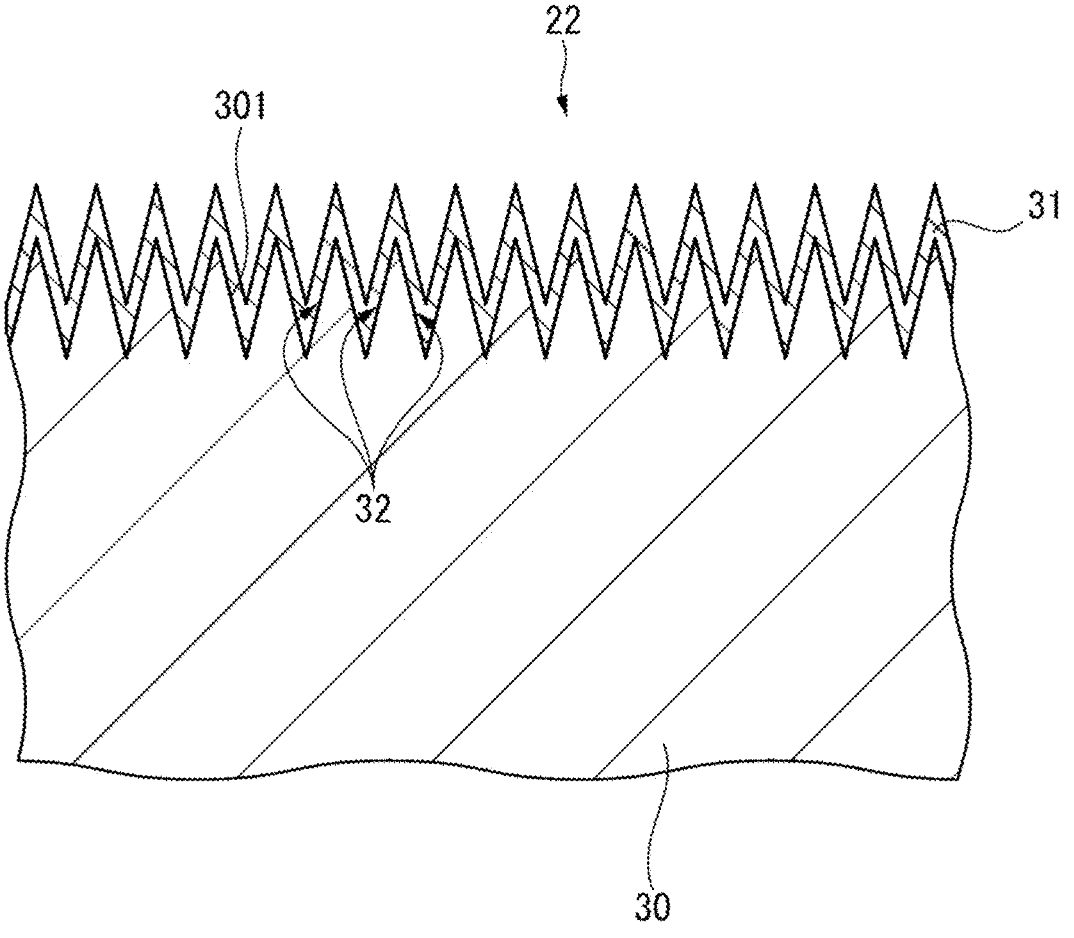
FIG. 6 is a cross-sectional view showing a main part of the first region of the dial of the first embodiment.
Figure 7:
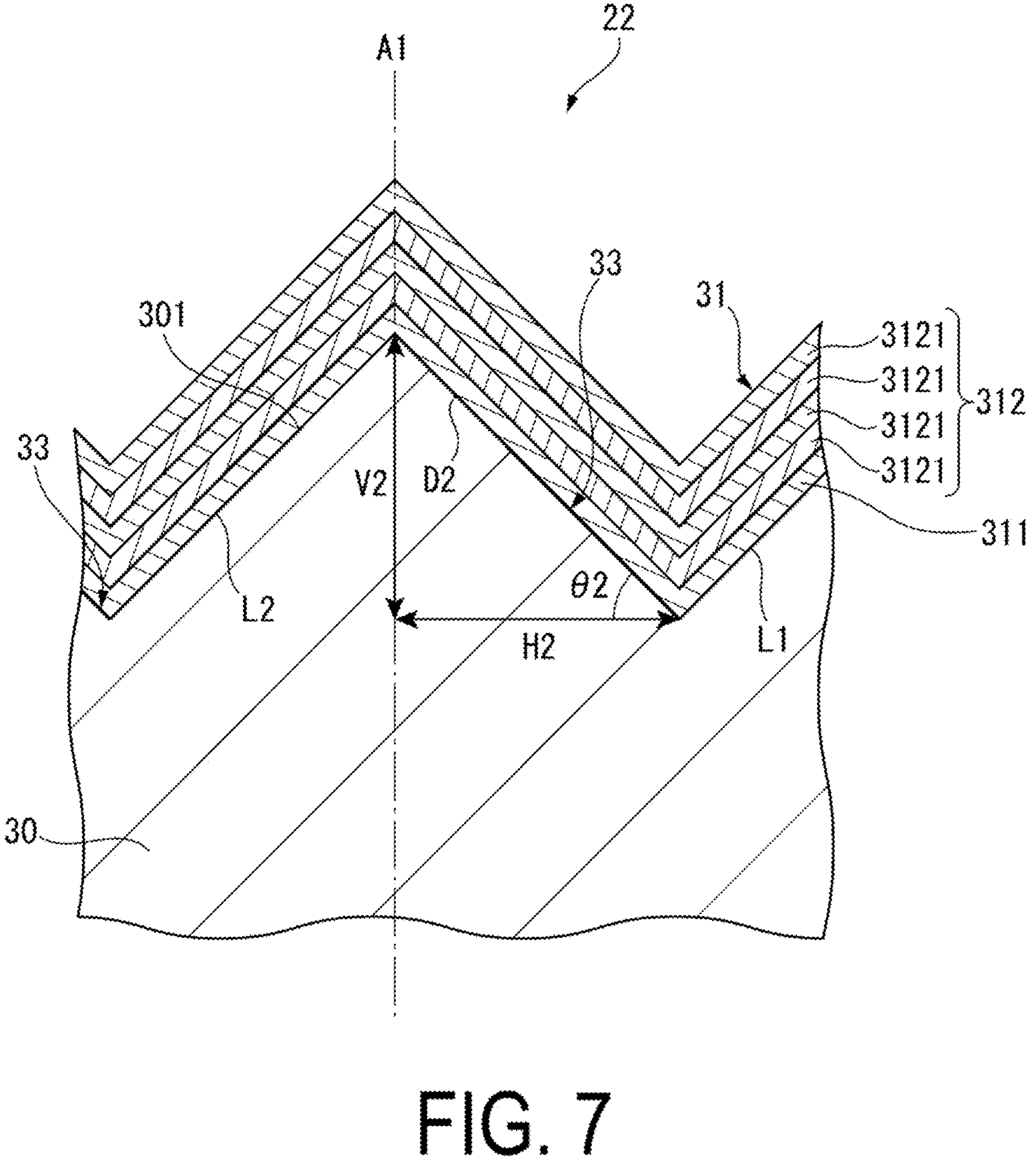
FIG. 7 is an enlarged cross-sectional view showing a main part of a second region of the dial of the first embodiment.
Figure 8:
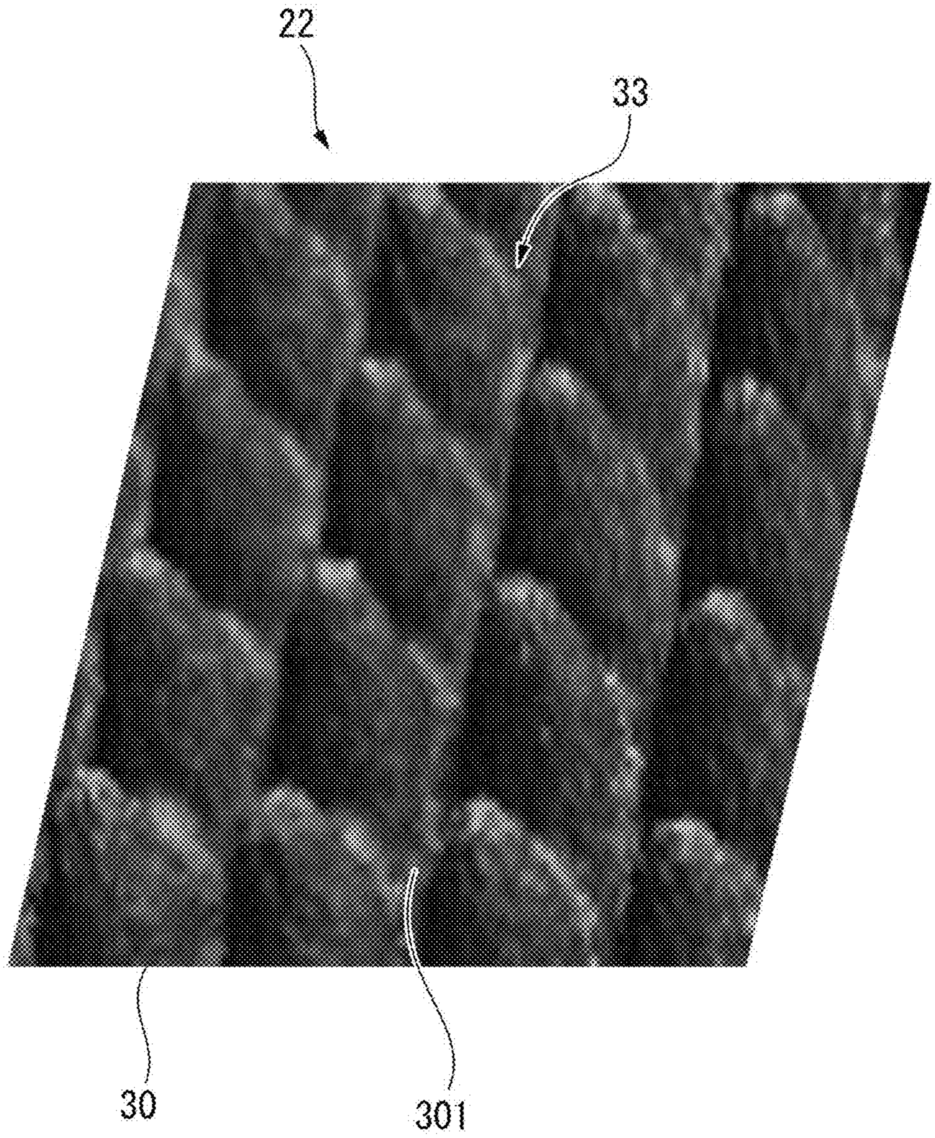
FIG. 8 is an enlarged perspective view showing a main part of the second region of the dial of the first embodiment.

FIG. 6 is a cross-sectional view showing a main part of the second region 22, FIG. 7 is an enlarged cross-sectional view showing a main part of the second region 22, and FIG. 8 is an enlarged perspective view showing a main part of the second region 22. FIGS. 6 and 7 are cross-sectional views of the substrate 30 of the dial 2 taken in a thickness direction thereof.

As shown in FIGS. 6 to 8, the second region 22 of the dial 2 includes the substrate 30 and the multilayer film 31 described above.

In the first embodiment, a plurality of second recesses 33 are formed on the surface 301 of the substrate 30 in the second region 22.

Second Recess

In a cross-sectional view of the substrate 30 taken in the thickness direction, second recesses 33 are each defined by a second straight side L2 and a second oblique side D2 that is inclined with respect to the second straight side L2 and has one end meeting the second straight side L2. Similar to the first recesses 32 described above, the second straight side L2 is inclined such that it is axially symmetrical to the second oblique side D2 with respect to an axis of symmetry A1 extending in the thickness direction of the substrate 30. More specifically, in the first embodiment, the second recesses 33 are formed such that a plurality of conical protrusions are formed on the surface 301 as shown in FIG. 8.

The angle of the second oblique side D2 with respect to the direction orthogonal to the thickness direction of the substrate 30 is defined as θ2.

The second straight side L2 is an example of a first side in the present disclosure and the second oblique side D2 is an example of a second side in the present disclosure.

Similar to the first recesses 32 described above, each second recess 33 is formed such that the ratio of a length V2 of the second oblique side D2 in the thickness direction of the substrate 30 to a length H2 of the second oblique side D2 in the direction orthogonal to the thickness direction of the substrate 30 is greater than 1:6. That is, each second recess 33 is formed such that the ratio of V2 to H2 is greater than 1/6.

In other words, each second recess 33 is formed such that the length H2 of the second oblique side D2 in the direction orthogonal to the thickness direction of the substrate 30 is less than 6 when the length V2 of the second oblique side D2 in the thickness direction of the substrate 30 is 1, that is, such that H2 is less than six times V2.

Here, in the first embodiment, the first recess 32 and the second recess 33 are formed such that the angle θ1 of the first oblique side D1 of the first recess 32 is greater than the angle θ2 of the second oblique side D2 of the second recess 33.

That is, the first recess 32 and the second recess 33 are formed such that the ratio of V1 to H1 of the first recess 32 is greater than the ratio of V2 to H2 of the second recess 33.

By way of example, the first recess 32 and the second recess 33 are formed such that the ratio of V1 to H1 of the first recess 32 is 1:3 and the ratio of V2 to H2 of the second recess 33 is 1:4.

Third Region 23

Figure 9:
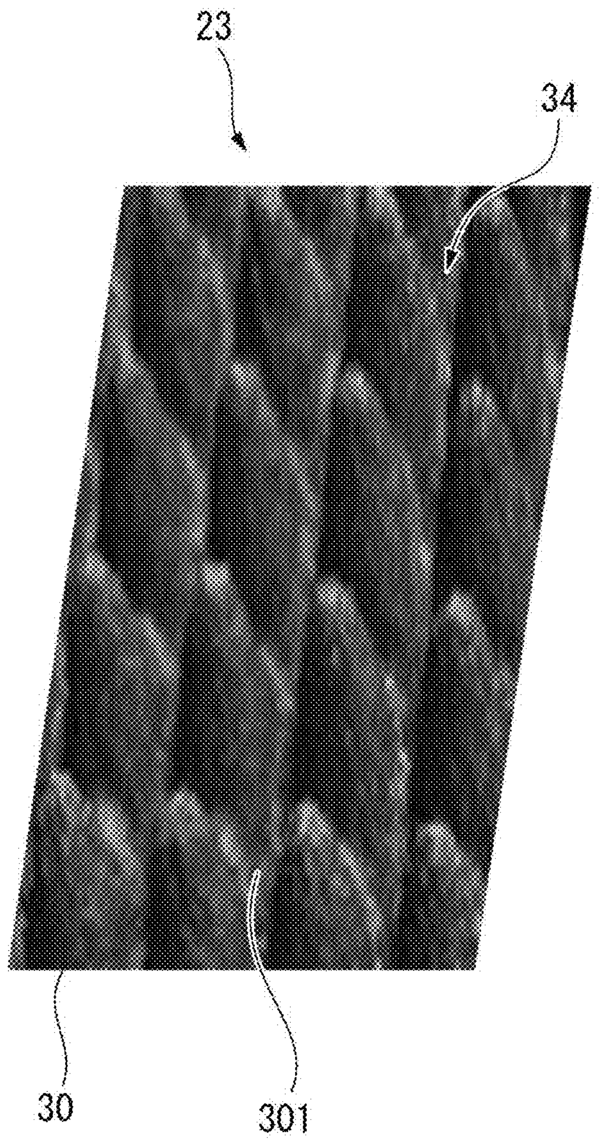
FIG. 9 is an enlarged perspective view showing a main part of a third region of the dial of the first embodiment.

FIG. 9 is an enlarged perspective view showing a main part of the third region 23.

As shown in FIG. 9, a plurality of conical protrusions are also formed on the surface of the substrate 30 in a third region 23 to form third recesses 34. The depths of the recesses 32, 33, 34 are not particularly limited and are, for example, about several tens of micrometers.

In the first embodiment, the surface 301 of the substrate 30 is smooth in regions other than the first region 21, the second region 22, and the third region of the dial 2.

In the first embodiment, the surface 301 of the substrate 30 of the dial 2 being smooth is not limited to the surface 301 being completely smooth and indicates a state in which the recesses 32, 33, or 34 described above are not formed on the surface 301, including a state in which recesses and protrusions of about 5 μm or recesses and protrusions of about 10 μm are present on the surface 301.

Method for Manufacturing Dial

Next, a method for manufacturing the dial 2 will be described.

First, a plurality of first recesses 32 are formed on the surface 301 of the substrate 30 in the first region 21 of the dial 2. For example, the surface 301 of the substrate 30 is subjected to processing such as cutting, laser processing, chemical removal, polishing, forging/casting, or the like to form the first recesses 32. At this time, a plurality of conical protrusions are formed on the surface 301 by forming the first recesses 32 such that the ratio of a length V1 of the first oblique side D1 in the thickness direction of the substrate 30 to a length H1 of the first oblique side D1 in the direction orthogonal to the thickness direction of the substrate 30 is greater than 1:6.

Next, a plurality of second recesses 33 are formed on the surface 301 of the substrate 30 in the second region 22 of the dial 2. For example, the surface 301 of the substrate 30 is subjected to processing such as cutting, laser processing, chemical removal, polishing, forging/casting, or the like to form the second recesses 33. At this time, a plurality of conical protrusions are formed on the surface 301 by forming the second recesses 33 such that the ratio of a length V2 of the second oblique side D2 in the thickness direction of the substrate 30 to a length H2 of the second oblique side D2 in the direction orthogonal to the thickness direction of the substrate 30 is greater than 1:6. Then, a plurality of third recesses 34 are formed on the surface 301 of the substrate 30 in the third region 23 of the dial 2 in the same manner as described above.

Here, the processing method for forming the first recesses 32, the second recesses 33, and the third recesses 34 is not limited.

Here, in the first embodiment, the first recess 32 and the second recess 33 are formed such that the angle θ1 of the first oblique side D1 of the first recess 32 is greater than the angle θ2 of the second oblique side D2 of the second recess 33 as described above. That is, the first recess 32 and the second recess 33 are formed such that the ratio of V1 to H1 of the first recess 32 is greater than the ratio of V2 to H2 of the second recess 33.

Then, a multilayer film 31 is laminated on the surface 301 of the substrate 30 in the first region 21, the second region 22, and the third region 23. Specifically, a color absorbing film 311 is formed on the surface 301 of the substrate 30 by ion-assisted vapor deposition, ion plating vapor deposition, vacuum vapor deposition, sputtering, or the like. After that, a color adjusting film 312 including a plurality of inorganic layers 3121 is laminated by ion-assisted vapor deposition, ion plating vapor deposition, vacuum vapor deposition, sputtering, or the like. Thus, the dial 2 can be manufactured.

Further, the watch 1 can be manufactured by using the dial 2 manufactured by such a manufacturing method for the watch 1.

In the first embodiment, the inclinations of the oblique sides D1 and D2 of the recesses 32, 33, and 34 can be changed arbitrarily by forming the recesses 32, 33, and 34 using processing such as cutting, laser processing, chemical removal processing, polishing, forging/casting, or the like.

Figure 10:
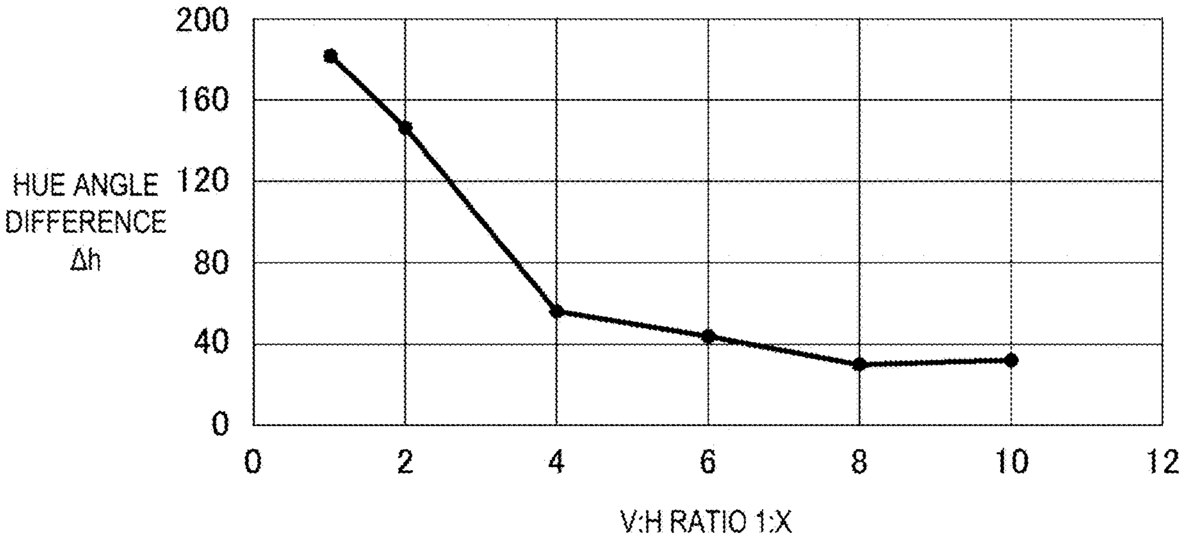
FIG. 10 is a diagram showing the relationship between a hue angle difference and the ratio of a length V of an oblique side in the thickness direction of a substrate to a length H of the oblique side in a direction orthogonal to the thickness direction of the substrate.

FIG. 10 is a diagram showing the relationship between a hue angle difference and the ratio of a length V of an oblique side in the thickness direction of a substrate to a length H of the oblique side in the direction orthogonal to the thickness direction of the substrate. In FIG. 10, recesses were formed on each substrate formed using a metal such as iron, brass, or aluminum such that the ratio of a length V of an oblique side in the thickness direction of the substrate to a length H of the oblique side in the direction orthogonal to the thickness direction of the substrate was 1:1 to 1:10 and a multilayer film was laminated on a surface of the substrate and hue angles were measured. The hue angle difference Δh is a difference between a hue angle of a portion where the recesses are formed and a hue angle of a portion where no recesses are formed. In the present disclosure, the hue angle is a value obtained from a* and b* values in a Lab display system defined by the Commission Internationale de l'Eclairage (CIE).

It is suggested that the difference hue angle Δh from the portion where no recesses are formed increases as the ratio of the length V of the oblique side in the thickness direction of the substrate to the length H of the oblique side in the direction orthogonal to the thickness direction of the substrate increases as shown in FIG. 10. This is thought to be because the color tone of light interfered by the multilayer film laminated on the oblique side changes depending on the inclination of the oblique side. This suggests that the hue of the dial 2 can be changed by changing the inclinations of the oblique sides D1 and D2 in the first embodiment.

In particular, it is suggested that the difference hue angle Δh from the portion where no recesses are formed is great when the ratio of the length V of the oblique side in the thickness direction of the substrate to the length H of the oblique side in the direction orthogonal to the thickness direction of the substrate is greater than 1:6, that is, when the ratio of V to H is greater than 1/6. Thus, in the first embodiment, it is suggested that the difference between the hue angle of a portion where the recesses 32, 33, or 34 are formed and the hue angle of a portion where no recesses 32, 33, or 34 are formed can be increased and the change in hue angle between a portion where the recesses 32, 33, or 34 are formed and a portion where no recesses are formed can be increased by making the ratio of V1 or V2 to H1 or H2 greater than 1:6.

It is also suggested that the hue angle increases as the ratio of the length V of the oblique side in the thickness direction of the substrate to the length H of the oblique side in the direction orthogonal to the thickness direction of the substrate increases as shown in FIG. 10.

In the first embodiment, the first recess 32 and the second recess 33 are formed such that the ratio of V1 to H1 of the first recess 32 is greater than the ratio of V2 to H2 of the second recess 33 as described above. That is, the first recess 32 and the second recess 33 are formed such that the angle θ1 of the first oblique side D1 of the first recess 32 is greater than the angle θ2 of the second oblique side D2 of the second recess 33. Thus, the hue angle of the first region 21 can be made greater than the hue angle of the second region 22. That is, a hue change can be made between the first region 21 and the second region 22 and a plurality of hues can be imparted to the dial 2.

Advantages of First Embodiment

The first embodiment can achieve the following advantages.

In the first embodiment, a plurality of recesses 32 or 33 are formed on the surface 301 of the substrate 30 facing the multilayer film 31. In a cross-sectional view of the substrate 30 taken in the thickness direction, each of the plurality of recesses 32 or 33 is defined by a straight side L1 or L2 and an oblique side D1 or D2 that is inclined with respect to the straight side L1 or L2 and has one end meeting the straight side L1 or L2. Accordingly, the hue of the dial 2 can be changed by changing the inclination of the oblique side D1 or D2 because the color tone of light interfered by the multilayer film 31 laminated on the oblique side D1 or D2 changes depending on the inclination of the oblique side D1 or D2.

In the first embodiment, the inclination angle θ1 of the first oblique side D1 of the first recess 32 with respect to the direction orthogonal to the thickness direction of the substrate 30 is greater than the inclination angle θ2 of the second oblique side D2 of the second recess 33, such that a hue change can be made between the first region 21 and the second region 22. Thus, a plurality of hues can be imparted to the dial 2.

In the first embodiment, the inclination angle θ1 of the first oblique side D1 of the first recess 32 with respect to the direction orthogonal to the thickness direction of the substrate 30 is made greater than the inclination angle θ2 of the oblique side D2 of the second recess 33, such that the hue angle of the first region 21 can be greater than the hue angle of the second region 22.

In the first embodiment, in a cross-sectional view, the ratio of the length V1 or V2 of the oblique side D1 or D2 in the thickness direction of the substrate to the length H1 or H2 of the oblique side D1 or D2 in the direction orthogonal to the thickness direction is made greater than 1:6. Accordingly, it is possible to increase the difference between the hue angle of a portion where recesses 32 or 33 are formed and the hue angle of a portion where no recesses 32 or 33 are formed and thus it is possible to increase the hue change between the portion where recesses 32 or 33 are formed and the portion where no recesses are formed.

In the first embodiment, the multilayer film 31 may include a color adjusting film 312 made of a material including at least one selected from the group consisting of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$. Accordingly, it is possible to extend the range of color tones that can be expressed by the dial 2. Further, it is possible to improve the appearance stability and durability of the dial 2 because such inorganic substances have high chemical stability.

In the first embodiment, the multilayer film 31 includes a color absorbing film 311 formed using a metal. Accordingly, it is possible to obtain a luxurious appearance with the dial 2.

In the first embodiment, in a cross-sectional view, the straight side L1 or L2 is inclined such that the straight side L1 or L2 is axially symmetrical to the oblique side D1 or D2 with respect to the axis of symmetry A1 extending in the thickness direction of the substrate 30. Accordingly, the color tone of light interfered by the multilayer film 31 laminated on the straight side L1 or L2 can also be changed in the same way as light interfered by the multilayer film 31 laminated on the oblique side D1 or D2 because the straight side L1 or L2 is inclined such that it is axially symmetrical to the oblique side D1 or D2.

In the first embodiment, the recesses 32 or 33 are formed using any one of cutting, laser processing, and chemical removal. Accordingly, it is possible to arbitrarily change the inclination of the oblique side D1 or D2 of each recess 32 or 33.

Second Embodiment

Next, a second embodiment of the present disclosure will be described based on FIGS. 11 and 12. The second embodiment differs from the first embodiment described above in that each first recess 32A in a first region 21A is defined by a first side L3 and a second side D3 that are curved.

In the second embodiment, components which are the same as or similar to those of the first embodiment are denoted by the same reference numerals and description thereof is omitted or simplified.

First Region

Figure 11:
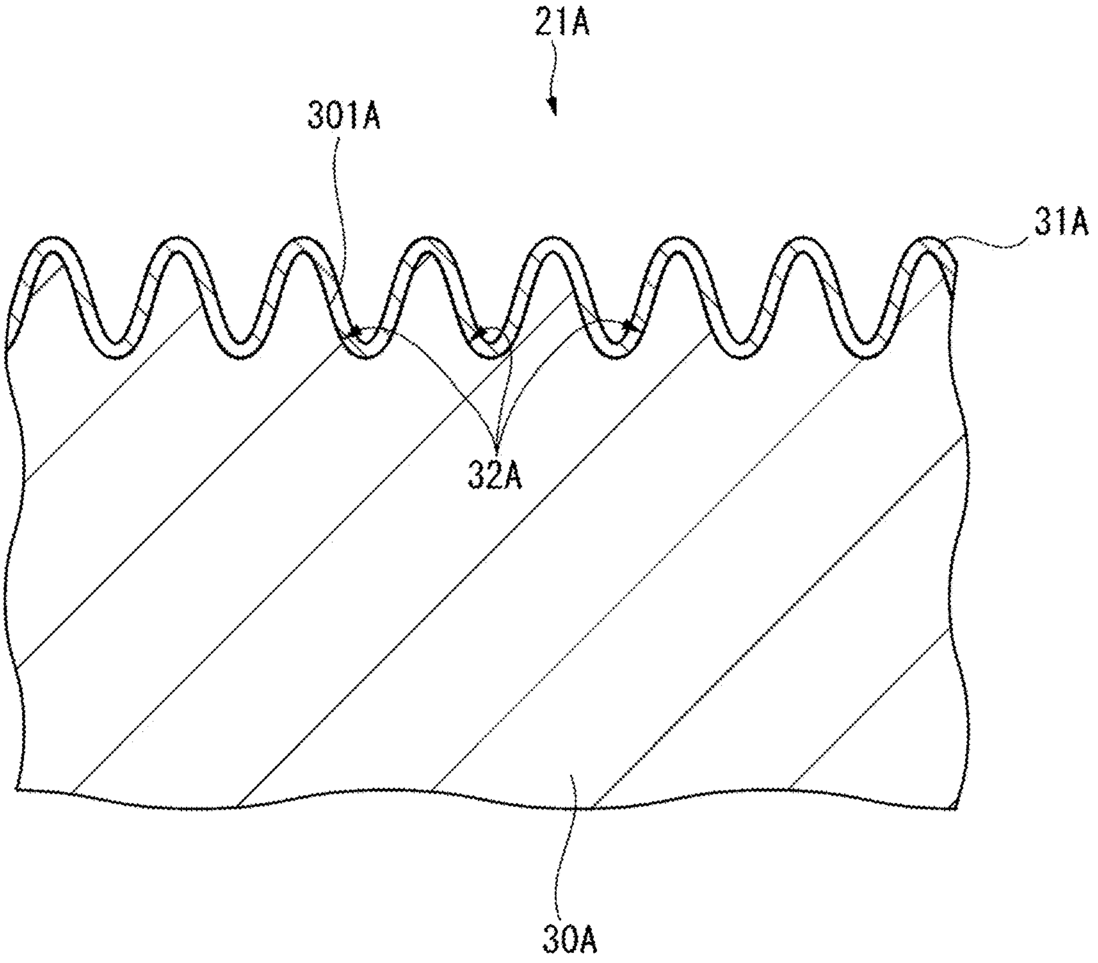
FIG. 11 is a cross-sectional view showing a main part of a first region of a second embodiment.
Figure 12:
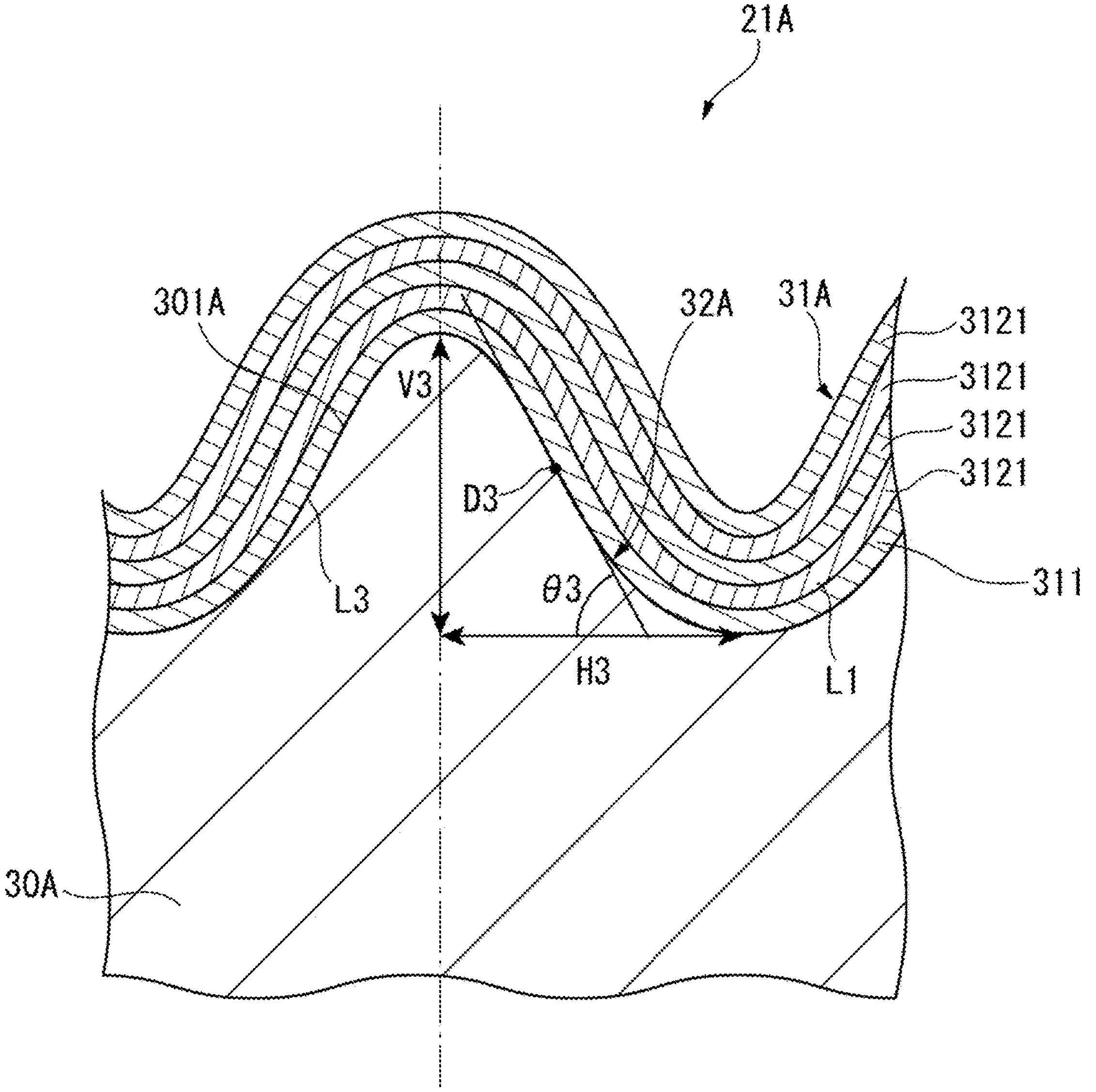
FIG. 12 is an enlarged cross-sectional view showing a main part of the first region of a dial of the second embodiment.

FIG. 11 is a cross-sectional view showing a main part of the first region 21A and FIG. 12 is an enlarged cross-sectional view showing a main part of the first region 21A. FIGS. 11 and 12 are cross-sectional views of a substrate 30A taken in the thickness direction in the first region 21A.

As shown in FIGS. 11 and 12, the first region 21A includes the substrate 30A and a multilayer film 31A, similar to the first embodiment described above.

First Recess

In a cross-sectional view of the substrate 30A taken in the thickness direction, first recesses 32A are each defined by a first side L3 and a second side D3 that is inclined with respect to the first side L3 and has one end meeting the first side L3. In the second embodiment, the first side L3 and the second side D3 are curved.

The first recesses 32A are formed such that a plurality of conical protrusions are formed at a surface 301A, similar to the first embodiment described above.

In the second embodiment, a first side and a second side that define each second recess in a second region are also curved although not shown.

Each first recess 32A is formed such that the ratio of a length V3 of a second side D3 in the thickness direction of the substrate 30A to a length H3 of the second side D3 in the direction orthogonal to the thickness direction of the substrate 30A is greater than 1:6, similar to the first embodiment described above. That is, each first recess 32A is formed such that the ratio of V3 to H3 is greater than 1/6.

Here, in the second embodiment, the angle of a tangent line at a midpoint of the second side D3 with respect to the direction orthogonal to the thickness direction of the substrate 30A is defined as θ3. The first recess 32A and the second recess are formed such that the angle θ3 is greater than an angle θ1 formed between a tangent line at the midpoint of a second side in the second region and the direction orthogonal to the thickness direction of the substrate 30A.

Advantages of Second Embodiment

The second embodiment can achieve the following advantages.

In the second embodiment, the first side L3 and the second side D3 that define the first recess 32A are curved. Thus, the sides defining the first recess 32A are not limited to straight lines, such that the degree of freedom in processing for forming the first recess 32A can be increased.

Modifications

The present disclosure is not limited to the above embodiments and includes modifications, improvements, and the like within a range that can achieve the object of the present disclosure.

Figure 13:
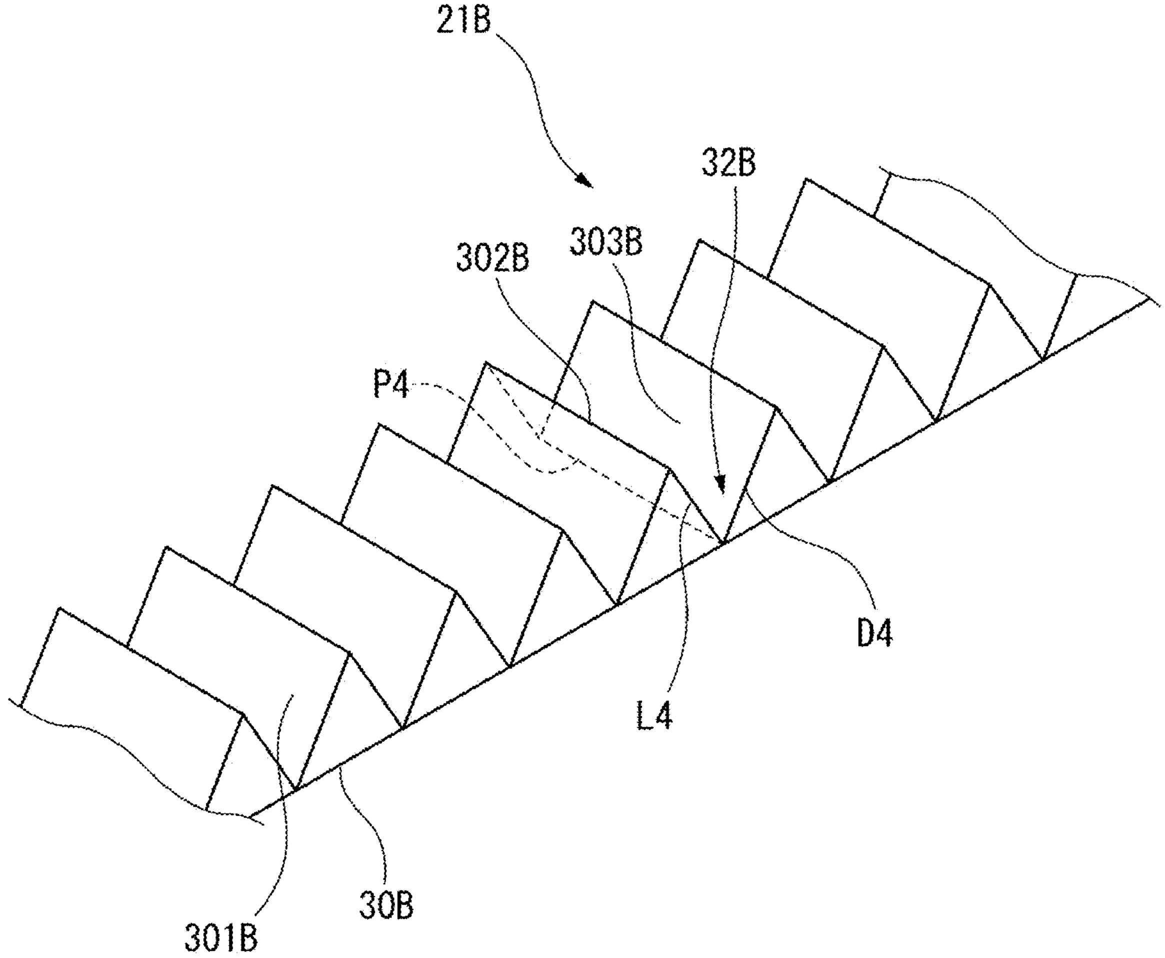
FIG. 13 is a perspective view showing a main part of a first region of a modification.

FIG. 13 is a perspective view showing a main part of a first region 21B of a modification.

In the first region 21B of the modification, first surfaces 302B and second surfaces 303B are formed at a surface 301B of a substrate 30B as shown in FIG. 13. Each first surface 302B is defined as a rectangular shape by a first side L4 and a third side P4 which is orthogonal to the first side L4 and a second side D4. Similarly, each second surface 303B is defined as a rectangular shape by a second side D4 and a third side P4. Further, the angle of the second surface 303B with respect to the first surface 302B is constant.

Each first recess 32B is defined by a first surface 302B and a second surface 303B defined as described above. That is, the surface 301B of the substrate 30B is formed in the shape of ridges. Employing this configuration can facilitate processing of the surface 301B of the substrate 30B. The inclination of the second surface 303B with respect to the first surface 302B can be set arbitrarily.

Figure 14:
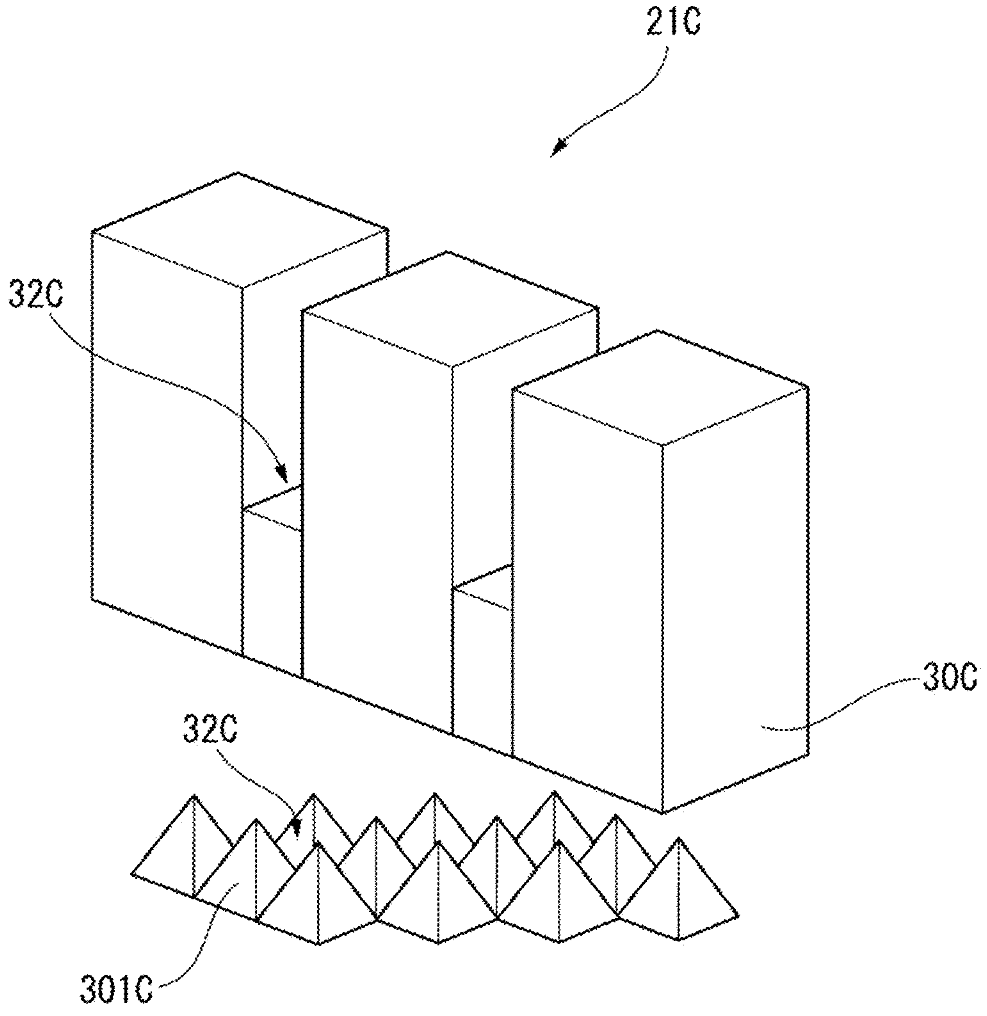
FIG. 14 is a perspective view showing a main part of a first region of another modification.

FIG. 14 is a perspective view showing a main part of a first region 21C of another modification.

Quadrangular pyramidal protrusions or cubic protrusions may be formed at a surface 301C of a substrate 30C in the first region 21C to form first recesses 32C as shown in FIG. 14.

In the above embodiments, the watch part of the present disclosure is configured as the dial 2, but the present disclosure is not limited to this. For example, the watch part of the present disclosure may be configured as any one of a case, a dial ring, a glass edge, a movement, a hand, an abbreviation, and an oscillating weight.

In the above embodiments, the first recess 32 and the second recess 33 are formed such that the angle θ1 of the first oblique side D1 of the first recess 32 in the first region 21 is greater than the angle θ2 of the second oblique side D2 of the second recess 33 in the second region 22, but the present disclosure is not limited to this. For example, the first recess and the second recess may be formed such that the angle of the second side of the second recess in the second region is greater than the angle of the first side of the first recess in the first region.

A first region and a second region having recesses whose second sides are at different angles may also be formed in the case body.

Further, recesses may be formed such that the angles of second sides of the recesses gradually change. Employing this configuration can change the hue in a gradual manner.

SUMMARY OF PRESENT DISCLOSURE

A watch part of the present disclosure includes a substrate, and a multilayer film covering at least a part of the substrate, wherein a plurality of recesses are formed at a surface of the substrate facing the multilayer film, and in a cross-sectional view of the substrate taken in a thickness direction thereof, each of the plurality of recesses is defined by a first side and a second side that is inclined with respect to the first side and has one end meeting the first side.

In the present disclosure, a plurality of recesses are formed on the surface of the substrate facing the multilayer film. In the cross-sectional view of the substrate taken in the thickness direction, each of the plurality of recesses is defined by a first side and a second side that is inclined with respect to the first side and has one end meeting the first side. Accordingly, the hue of the watch part can be changed by changing the inclination of the second side because the color tone of light interfered by the multilayer film laminated on the second side changes depending on the inclination of the second side.

In the watch part of the present disclosure, the substrate may have a first region and a second region in which the recesses are formed, and in the cross-sectional view, an inclination angle of the oblique side of each recess in the first region with respect to a direction orthogonal to the thickness direction of the substrate may be greater than an inclination angle of the oblique side of each recess in the second region with respect to the direction orthogonal to the thickness direction of the substrate.

Accordingly, a hue change can be made between the first region and the second region because the inclination angle of the oblique side of each recess in the first region with respect to the direction orthogonal to the thickness direction of the substrate is greater than the inclination angle of the oblique side of each recess in the second region. Thus, a plurality of hues can be imparted to the watch part.

In the watch part of the present disclosure, a hue angle of the first region may be greater than a hue angle of the second region.

Accordingly, the inclination angle of the oblique side of each recess in the first region with respect to the direction orthogonal to the thickness direction of the substrate is made greater than the inclination angle of the oblique side of each recess in the second region, such that the hue angle of the first region can be greater than the hue angle of the second region.

In the watch part of the present disclosure, in the cross-sectional view, a ratio of a length of the oblique side in the thickness direction of the substrate to a length of the oblique side in the direction orthogonal to the thickness direction may be greater than 1:6.

Accordingly, it is possible to increase the difference between the hue angle of a portion where recesses are formed and the hue angle of a portion where no recesses are formed and thus it is possible to increase the hue change between the portion where recesses are formed and the portion where no recesses are formed.

In the watch part of the present disclosure, the multilayer film may include a color adjusting film made of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$.

Accordingly, it is possible to extend the range of color tones that can be expressed by the watch part. Further, it is possible to improve the appearance stability and durability of the watch part because such inorganic substances have high chemical stability.

In the watch part of the present disclosure, the multilayer film may include a color absorbing film formed using a metal.

Accordingly, it is possible to obtain a luxurious appearance with the watch part.

In the watch part of the present disclosure, in the cross-sectional view, the straight side may be inclined such that the straight side is axially symmetrical to the oblique side with respect to an axis of symmetry extending in the thickness direction of the substrate.

Accordingly, the color tone of light interfered by the multilayer film laminated on the straight side can also be changed in the same way as light interfered by the multilayer film laminated on the oblique side because the straight side is inclined such that it is axially symmetrical to the oblique side.

In the watch part of the present disclosure, each of the recesses may be defined by a first surface defined by the first side and a third side orthogonal to the first side and the second side and a second surface defined by the second side and the third side, and an angle of the second surface with respect to the first surface may be constant.

Accordingly, it is possible to facilitate processing of the surface of the substrate because the surface of the substrate is formed in the shape of ridges.

A watch of the present disclosure is a watch configured using the above watch part, wherein any one of a dial ring, a glass edge, a movement, a dial, a hand, an abbreviation, and an oscillating weight is configured using the watch part.

A method for manufacturing a watch part of the present disclosure is a method for manufacturing a watch part including a substrate and a multilayer film covering at least a part of the substrate, the method including forming a plurality of recesses at a surface of the substrate, and laminating the multilayer film at at least a part of the surface of the substrate at which the plurality of recesses are formed, wherein, in a cross-sectional view of the substrate taken in a thickness direction thereof, each of the plurality of recesses is defined by a straight side and an oblique side that is inclined with respect to the straight side and has one end meeting the straight side.

Accordingly, the hue of the watch part can be changed by changing the inclination of the oblique side because the color tone of light interfered by the multilayer film laminated on the oblique side changes depending on the inclination of the oblique side.

In the method of the present disclosure, the substrate may have a first region and a second region in which the recesses are formed, and the recesses may be formed such that an angle of the oblique side with respect to the straight side in the recess in the first region is greater than an angle of the oblique side with respect to the straight side in the recess in the second region.

Accordingly, a hue change can be made between the first region and the second region because the inclination angle of the oblique side of each recess in the first region with respect to the direction orthogonal to the thickness direction of the substrate is greater than the inclination angle of the oblique side of each recess in the second region. Thus, a plurality of hues can be imparted to the watch part.

In the method of the present disclosure, the recesses may be formed using any one of cutting, laser processing, chemical removal, polishing, and forging/casting.

Accordingly, it is possible to arbitrarily change the inclination of the oblique side of each recess.

A watch of the present disclosure is a watch configured using a watch part manufactured by the above method.

What is claimed is:

1. A watch dial comprising:

a substrate formed in a circular shape in a plan view, the substrate having a first island region and a second island region, each of the first and second island regions being spaced apart from each other and from a center of the substrate in the plan view;

a plurality of first recesses formed in the first island region of the substrate;

a first multilayer film covering the plurality of first recesses, the first multilayer film including a color absorbing layer configured to absorb color and a color adjusting layer configured to adjust, the color;

a plurality of second recesses formed in the second island region of the substrate; and a second multilayer film covering the plurality of second recesses, the second multilayer film including the color absorbing layer configured to absorb the color and the color adjusting layer configured to adjust the color, wherein, relative to the substrate, an outermost shape of each of the first and second multilayer films matches an outermost shape of each of the plurality of first and second recesses, in a cross-sectional view of the substrate taken in a thickness direction thereof, each of the plurality of first and second recesses is defined by a first side and a second side that is inclined with respect to the first side and has one end meeting the first side, and in the cross-sectional view, an inclination angle of the second side of a first recess of the plurality of first recesses in the first island region with respect to a direction orthogonal to the thickness direction of the substrate is greater than an inclination angle of the second side of a second recess of the plurality of second recesses in the second island region with respect to the direction orthogonal to the thickness direction of the substrate.

2. The watch dial according to claim 1, wherein a hue angle of the first region is greater than a hue angle of the second region.

3. The watch dial according to claim 1, wherein, in the cross-sectional view, a ratio of a length of the second side of the first recess in the thickness direction of the substrate to a length of the second side of the first recess in a direction orthogonal to the thickness direction is greater than 1:6.

4. The watch dial according to claim 1, wherein the color adjusting layer of each of the first and second multilayer films is made of a material including at least one of $Ta_2O_5$, $SiO_2$, $TiO_2$, $Al_2O_3$, $ZrO_2$, $Nb_2O_5$, $HfO_2$, $Na_5Al_3F_{14}$, $Na_3AlF_6$, $AlF_3$, $MgF_2$, $CaF_2$, $BaF_2$, $YF_3$, $LaF_3$, $CeF_3$, and $NdF_3$.

5. The watch dial according to claim 1, wherein the color absorbing layer of each of the first and second multilayer films contains a metal.

6. The watch dial according to claim 1, wherein, in the cross-sectional view, the first side of the first recess is inclined such that the first side of the first recess is axially symmetrical to the second side of the first recess with respect to an axis of symmetry extending in the thickness direction of the substrate.

7. The watch dial according to claim 1, wherein each of the plurality of first recesses is defined by a first surface and a second surface, the first surface is defined by the first side and a third side orthogonal to the first side and the second side, and the second surface is defined by the second side and the third side, and angles of the second surfaces with respect to the first surfaces are constant with respect to the plurality of first recesses.

8. A method for manufacturing a watch dial, the method comprising:

forming a plurality of first recesses in a first island of a substrate and a plurality of second recesses in a second island of the substrate, the substrate being in a circular shape in a plan view, each of the first and second island regions being spaced apart from each other and from a center of the substrate in the plan view;

laminating a first multilayer film at the first island of the substrate to cover the plurality of first recesses, the first multilayer film including a color absorbing layer configured to absorb color and a color adjusting layer configured to adjust the color; and laminating a second multilayer film at the second island of the substrate to cover the plurality of second recesses, the second multilayer film including the color absorbing layer configured to absorb the color and the color adjusting layer configured to adjust the color, wherein, relative to the substrate, an outermost shape of each of the first and second multilayer films matches an outermost shape of each of the plurality of first and second recesses, in a cross-sectional view of the substrate taken in a thickness direction thereof, each of the plurality of first and second recesses is defined by a first side and a second side that is inclined with respect to the first side and has one end meeting the first side, and in the cross-sectional view, an inclination angle of the second side of a first recess of the plurality of first recesses in the first island region with respect to a direction orthogonal to the thickness direction of the substrate is greater than an inclination angle of the second side of a second recess of the plurality of second recesses in the second island region with respect to the direction orthogonal to the thickness direction of the substrate.

9. The method for manufacturing a watch dial according to claim 8, wherein each of the plurality of first and second recesses is formed using any one of cutting, laser processing, chemical removal, polishing, and forging/casting.

10. A watch comprising the watch dial manufactured by the method according to claim 8.

* * * * *